(12) United States Patent
Tatsumi

(10) Patent No.: US 8,787,655 B2
(45) Date of Patent: Jul. 22, 2014

(54) IMAGE PROCESSING APPARATUS AND CONTROL METHOD THEREFOR

(75) Inventor: Eisaku Tatsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 13/278,481

(22) Filed: Oct. 21, 2011

(65) Prior Publication Data

US 2012/0121164 A1    May 17, 2012

(30) Foreign Application Priority Data

Nov. 12, 2010   (JP) .................................. 2010-254018

(51) Int. Cl.
*G06K 9/00*   (2006.01)

(52) U.S. Cl.
USPC ......................................................... 382/154

(58) Field of Classification Search
None
See application file for complete search history.

(56) References Cited

U.S. PATENT DOCUMENTS

| | | | |
|---|---|---|---|
| 5,045,952 A * | 9/1991 | Eschbach ....................... 358/447 |
| 6,175,379 B1 | 1/2001 | Uomori et al. |
| 6,570,566 B1 | 5/2003 | Yoshigahara |
| 7,558,420 B2 | 7/2009 | Era |
| 2011/0074925 A1 * | 3/2011 | Turner et al. ..................... 348/46 |

FOREIGN PATENT DOCUMENTS

| | | |
|---|---|---|
| JP | 08-205201 | 8/1996 |
| JP | 2000-156875 | 6/2000 |
| JP | 2005-136480 | 5/2005 |
| WO | 99/30280 A1 | 6/1999 |
| WO | 2004/019621 A1 | 3/2004 |

* cited by examiner

*Primary Examiner* — Stephen R Koziol
*Assistant Examiner* — Amandeep Saini
(74) *Attorney, Agent, or Firm* — Fitzpatrick, Cella, Harper & Scinto

(57) ABSTRACT

An image processing apparatus according to the present invention, comprises a calculation unit that calculates a sharpness of a 2D image for each region thereof; an image processing unit that performs image processing, in a region with a sharpness calculated by the calculation unit being higher than a first predetermined value, to increase that sharpness, and performing image processing, in a region with a sharpness calculated by the calculation unit being lower than a second predetermined value which is equal to or lower than the first predetermined value, to reduce that sharpness; and a generation unit that generates, from the 2D image processed by the image processing unit, an image for a left eye and an image for a right eye by shifting the 2D image in a horizontal direction.

6 Claims, 12 Drawing Sheets

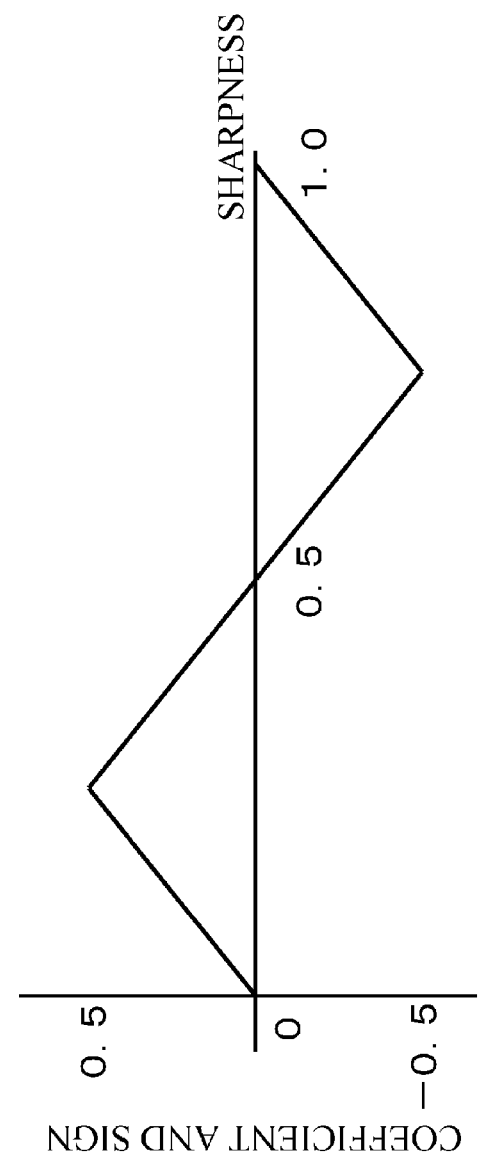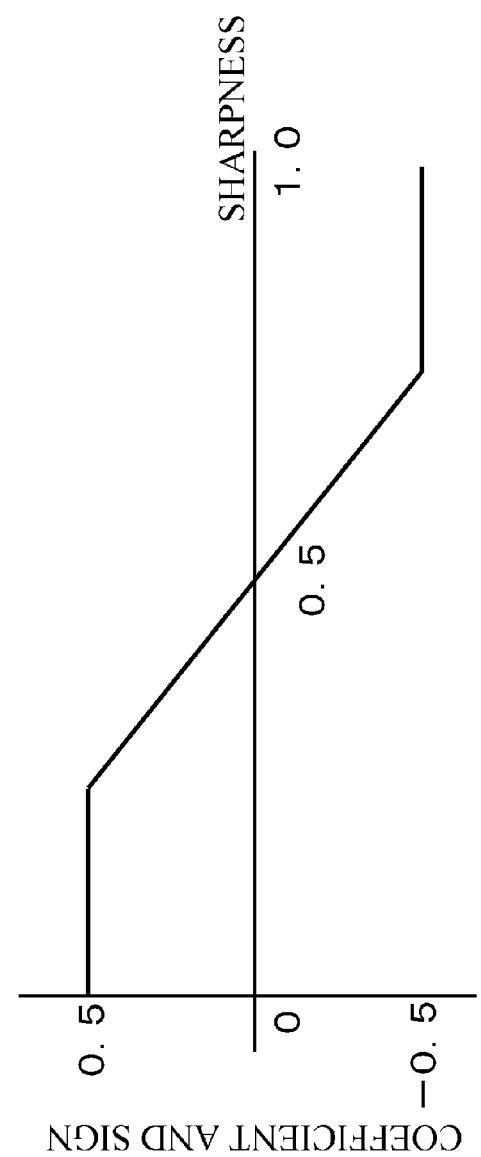

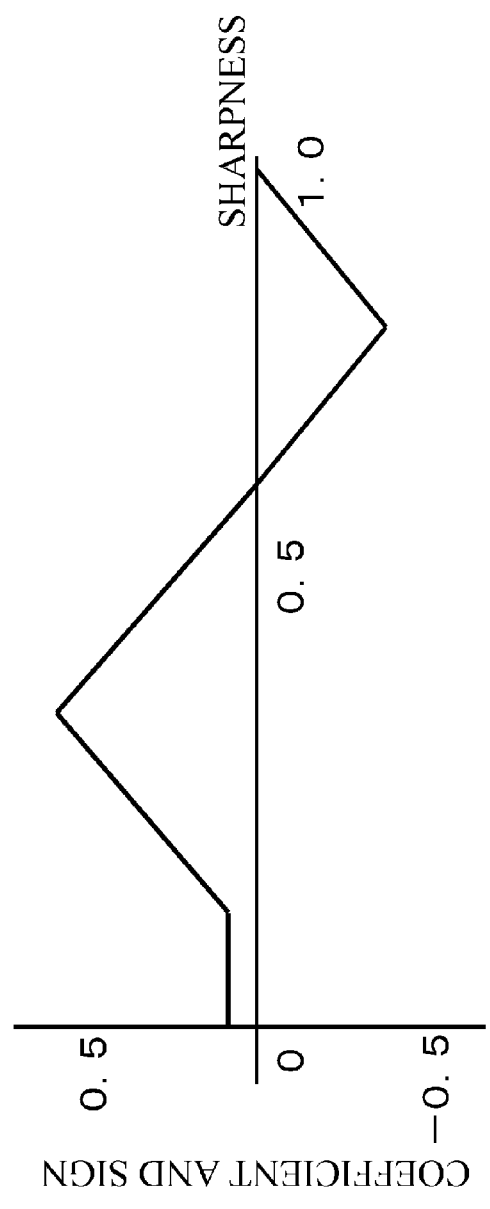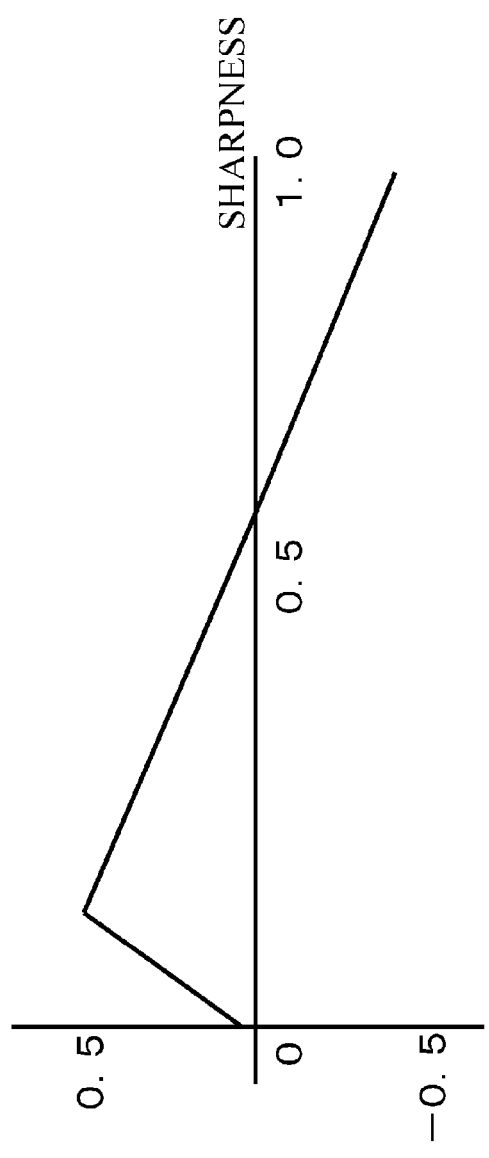

IMAGE PROCESSING APPARATUS AND CONTROL METHOD THEREFOR

BACKGROUND OF THE INVENTION

1. Field of the Invention

The present invention relates to an image processing apparatus for converting a 2D image into a 3D image, and a control method for such an apparatus.

2. Description of the Related Art

In order to create a 3D image from a 2D image, a dedicated and advanced hardware and software called a 2D-to-3D converter is used. A user is allowed to convert a 2D image into a 3D image by designating a front-and-back relationship of an object. Although this processing takes long time, it is suitable for a usage, such as a movie or the like, in which preliminary conversion is possible. In contrast, this time-consuming processing is not suitable for a usage, such as a broadcast program or the like, in which preliminary conversion is not possible and real-time conversion is required. In order to solve this problem, techniques have been proposed which are capable of converting a 2D image into a 3D image with a simple method.

JP H8-205201 A discloses a technique in which two images composed of an image for a left eye (also referred to as L-eye image) and an image for a right eye (also referred to as R-eye image) are generated by shifting a 2D image horizontally leftward or rightward, and these images are displayed alternately. A user wears liquid crystal shutter glasses so that the left eye sees only the L-eye image while the right eye sees only the R-eye image, and thus the user is caused to perceive the 2D image in three dimensions.

This related art (the method disclosed in JP H8-205201 A) will be described with reference to FIGS. 4 and 5.

FIG. 4 is a diagram illustrating a functional configuration of an apparatus for converting a 2D image into a 3D image (an image pair composed of an L-eye image and an R-eye image).

In FIG. 4, the reference numeral 111 indicates an L/R-eye image generation unit for generating two images of an L-eye image and R-eye image by shifting an input 2D image horizontally. The reference numeral 112 indicates a frame rate doubling processing unit for doubling the frame rate and outputting L- and R-eye images alternately. The reference numeral 113 indicates a display apparatus such as a LCD module. The reference numeral 114 indicates shutter glasses designed such that left and right lenses alternately let light pass through.

FIG. 5 is a diagram illustrating how a 2D image is converted into a 3D image according to the related art.

In FIG. 5, the reference numeral 121 indicates an original image, the reference numeral 123 indicates an image for a left eye (L-eye image), and the reference numeral 124 indicates an image for a right eye (R-eye image).

The L/R-eye image generation unit 111 uses an input 2D image directly as the R-eye image 124. Then, an L-eye image 123 is generated by shifting the input 2D image rightward, for example, by five pixels. In this case, the disparity between the L-eye image 123 and the R-eye image 124 is equal to a distance corresponding to five pixels.

The image output unit 112 outputs these two images (L- and R-eye images) alternately. These output images are displayed on the display apparatus 113 such as an LCD module operable at a frame rate of 120 Hz. The shutter glasses 114 controls left and right lenses (shutters) in synchronization with switching of the displayed image such that the right eye side lens lets light pass through when the R-eye image 124 is displayed and the left eye side lens lets light pass through when the L-eye image 123 is displayed. The user is thereby allowed to see the R-eye image 124 with his/her right eye and the L-eye image 123 with his/her left eye, and thus to see the 2D image in three dimensions.

A description will be made why a 2D image can be seen in three dimensions just by shifting the 2D image to the left or right direction. The 2D image 121 contains an image region which is visually in focus and an image region which is visually out of focus. The user is able to clearly perceive the shift in the horizontal direction for the image region which is visually in focus, but is substantially unable to perceive the shift in the horizontal direction for the image region which is visually out of focus. Therefore, the image region which is visually in focus seems to pop forward by the distance by which the image has been shifted, whereas the image region which is visually out of focus does not seem to pop forward so much as it has been shifted.

According to the method described in JP H8-205201 A, therefore, if an original image is an image, like a portrait, which is composed of a person which is visually in focus and a background which is sufficiently blurred, since only the person seems to pop forward, a sufficient three-dimensional effect can be obtained. However, if the original image is an image, like a deep-focus image, which is visually in focus as a whole (if the background of the original image is not sufficiently blurred), the entire image seems to pop forward, and hence the relative distance between objects that a viewer feels becomes insufficient. As a result, a sufficient three-dimensional effect cannot be obtained. In other words, the three-dimensional effect given to the viewer significantly depends on how much the original image is blurred.

JP 2000-156875 A discloses a technique in which a 2D image is created on an image creation side such that an object which is nearer to a viewer has a steeper edge, a higher contrast, or a darker color. A receiving side utilizes such information of the object image to change the shift amount in a horizontal direction between two L- and R-eye images.

According to this method, however, if the background image has a blur amount that is appropriate for providing a three-dimensional effect, the blur amount will be increased more than necessary. Thus, the quality of the image will be deteriorated by the excessive blur in the image.

Further, according to the technique disclosed in JP 2000-156875 A, it is assumed that image processing is performed on the transmission side (image creation side). Although JP 2000-156875 A describes that the three-dimensional effect can be obtained on the reception side even if image modulation is not performed on the transmission side, a similar problem to that of JP H8-205201 A described above will be posed if 2D-to-3D conversion is performed without adjusting the original image.

Further, it is assumed in the techniques described in JP H8-205201 A and JP 2000-156875 A that the focus is on an object located in front. Therefore, the front-and-back relationship between an object and a background will be reversed in an image in which the focus is on the background and the near distance is blurred.

Still further, JP 2005-136480 A discloses a method of obtaining an image with an appropriate blur amount by using two images having different points of focus from each other.

This method, however, is not able to provide an image with an adequate blur amount if only one original image is available.

SUMMARY OF THE INVENTION

The present invention provides a technique capable of converting a 2D image into a 3D image which can offer an adequate level of three-dimensional effect.

The present invention provides a technique capable of converting a 2D image into a 3D image having a correct front-and-back relationship with respect to an object regardless of a position of focus in the 2D image.

The present invention in its first aspect provides an image processing apparatus for converting a 2D image into a 3D image composed of an image for a left eye and an image for a right eye, the image processing apparatus comprising:

a calculation unit that calculates a sharpness of a 2D image for each region thereof;

an image processing unit that performs image processing, in a region with a sharpness calculated by the calculation unit being higher than a first predetermined value, to increase that sharpness, and performing image processing, in a region with a sharpness calculated by the calculation unit being lower than a second predetermined value which is equal to or lower than the first predetermined value, to reduce that sharpness; and a generation unit that generates, from the 2D image processed by the image processing unit, an image for a left eye and an image for a right eye by shifting the 2D image in a horizontal direction.

The present invention in its second aspect provides an image processing apparatus for converting a 2D image into a 3D image composed of an image for a left eye and an image for a right eye, the image processing apparatus comprising:

a determination unit that determines whether a focus position of a 2D image is in its foreground or background; and a generation unit that generates, from the 2D image, an image for a left eye and an image for a right eye by shifting the 2D image in a horizontal direction, according to a determination result of the determination unit, wherein when the determination unit determines that the focus position is in the foreground, the generation unit generates the image for a left eye by shifting the 2D image rightward relative to the image for a right eye, whereas when the determination unit determines that the focus position is in the background, the generation unit generates the image for a left eye by shifting the 2D image leftward relative to the image for a right eye.

The present invention in its third aspect provides a control method for an image processing apparatus for converting a 2D image into a 3D image composed of an image for a left eye and an image for a right eye, the control method comprising:

a determination step of determining whether a focus position of a 2D image is in its foreground or background; and a generation step of generating, from the 2D image, an image for a left eye and an image for a right eye by shifting the 2D image in a horizontal direction, according to a determination result in the determination step, wherein in the generation step, the image for a left eye is generated by shifting the 2D image rightward relative to the image for a right eye when it is determined in the determination step that the focus position is in the foreground, whereas the image for a left eye is generated by shifting the 2D image leftward relative to the image for a right eye when it is determined in the determination step that the focus position is in the background.

According to the present invention, a 2D image can be converted into a 3D image which can offer an adequate level of three-dimensional effect.

Further, a 2D image can be converted into a 3D image having a correct front-and-back relationship with respect to an object regardless of a position of focus in the 2D image.

Further features of the present invention will become apparent from the following description of exemplary embodiments with reference to the attached drawings.

BRIEF DESCRIPTION OF THE DRAWINGS

FIGS. 10A to 10F are diagrams illustrating examples of functions used in a comparison circuit according to the third embodiment.

DESCRIPTION OF THE EMBODIMENTS

First Embodiment

Figure 1:
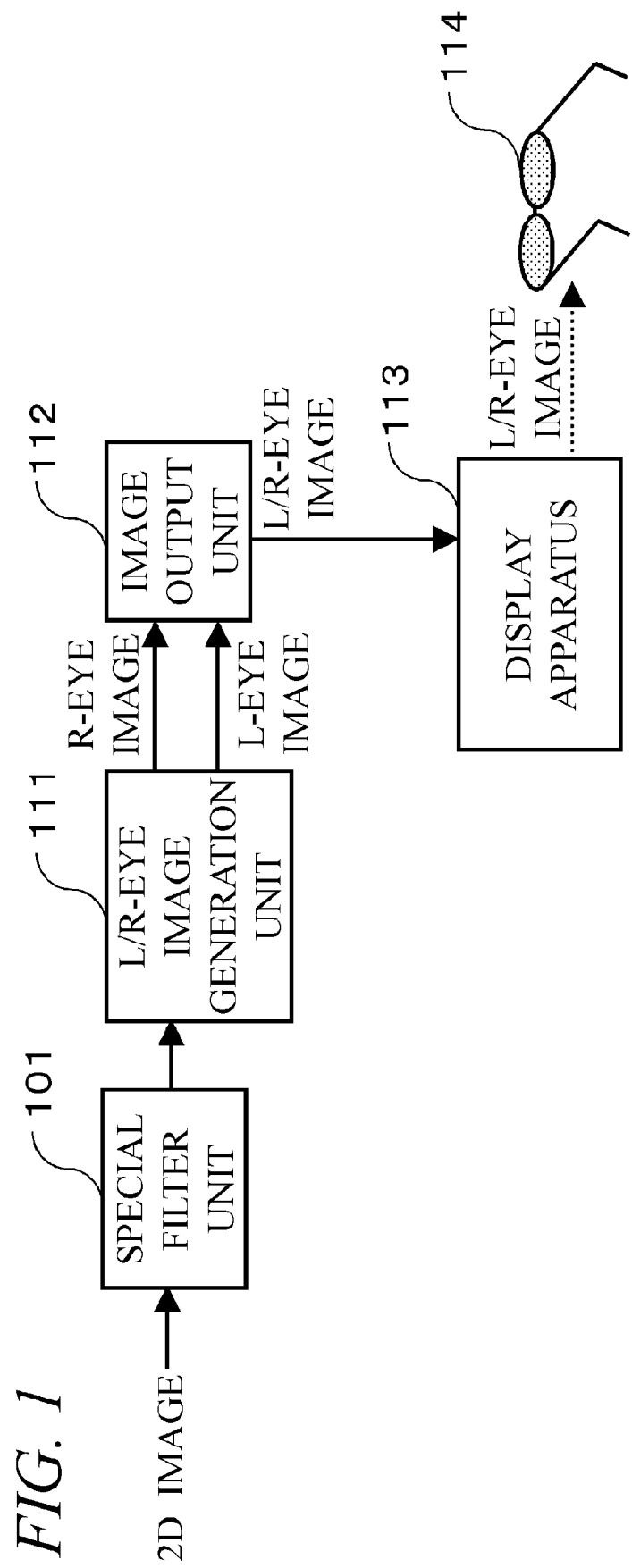
FIG. 1 is a diagram illustrating an example of a functional configuration of an image processing apparatus according to first and third embodiments.
Figure 2:
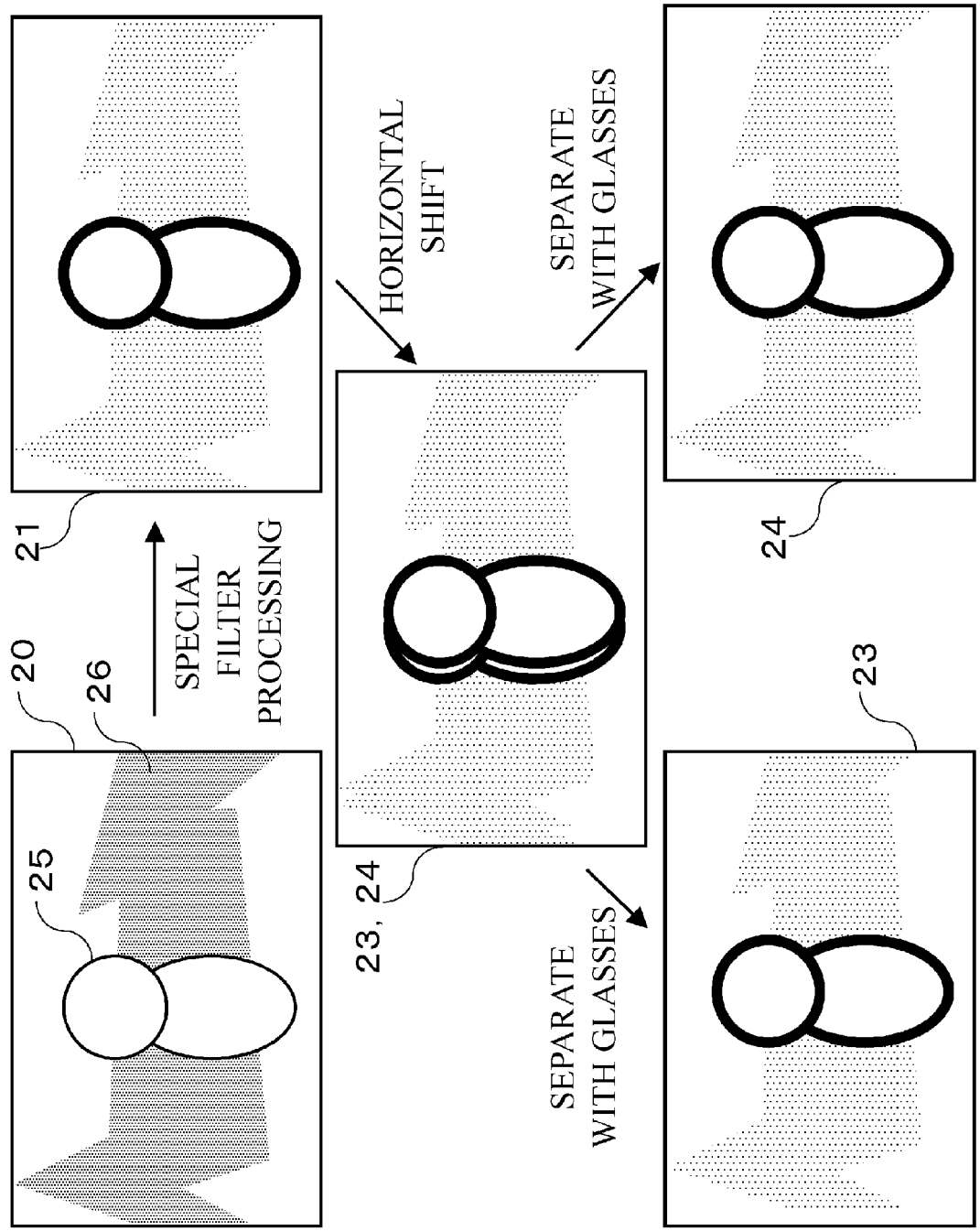
FIG. 2 is a diagram illustrating an example of how a 2D image is converted into a 3D image according to the first embodiment.
Figure 3:
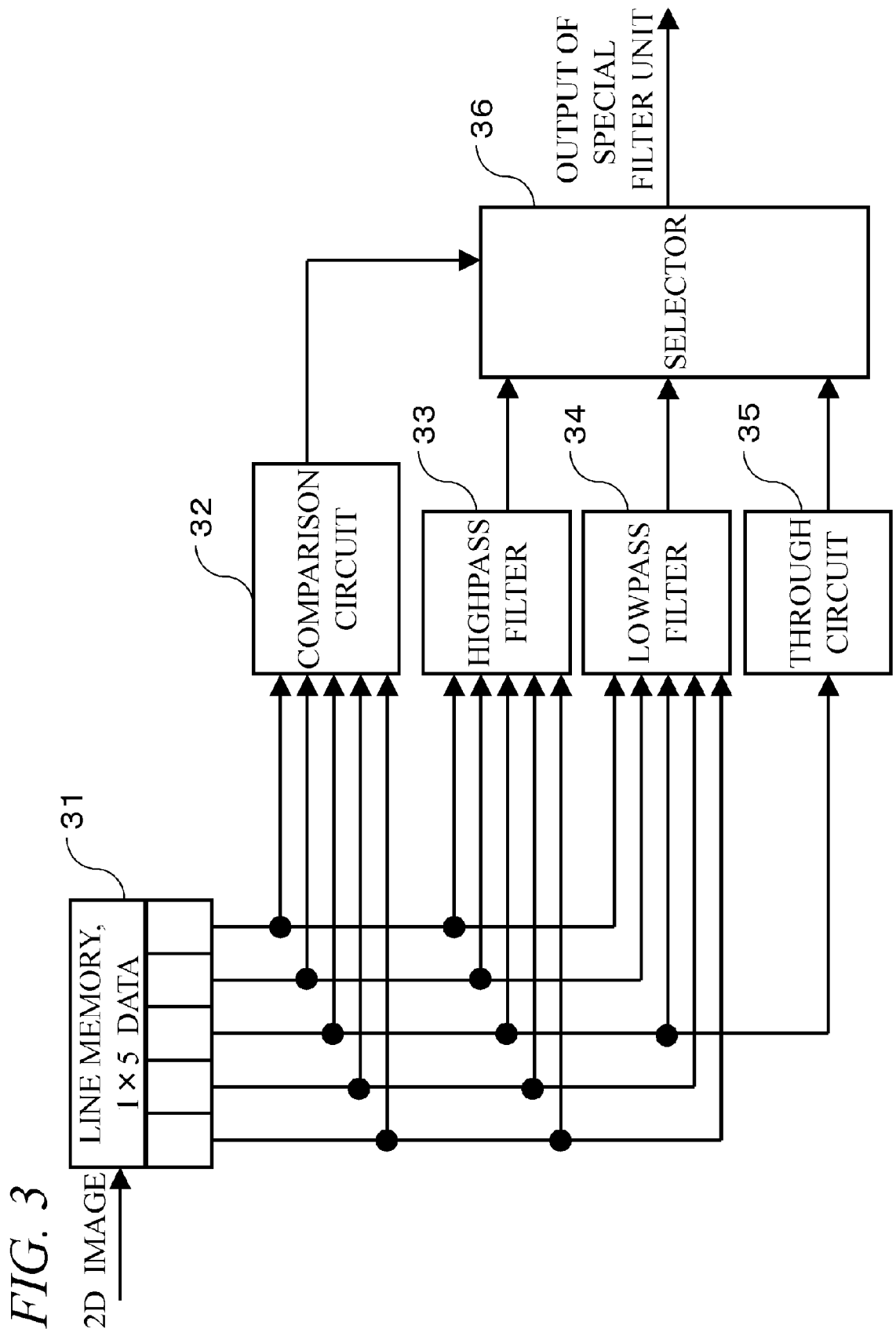
FIG. 3 is a diagram illustrating an example of a configuration of a special filter according to the first embodiment.
Figure 4:
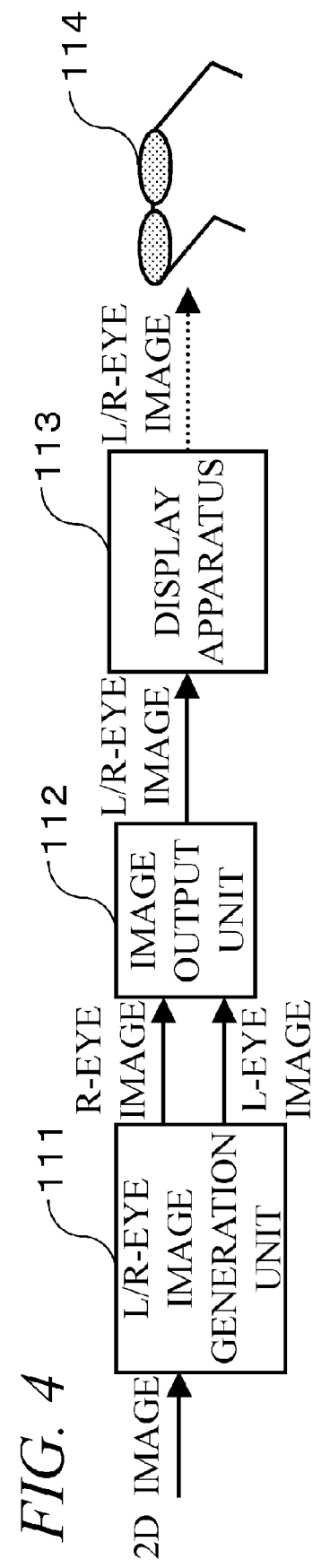
FIG. 4 is a diagram illustrating a related-art example of an apparatus for converting a 2D image into a 3D image.
Figure 5:
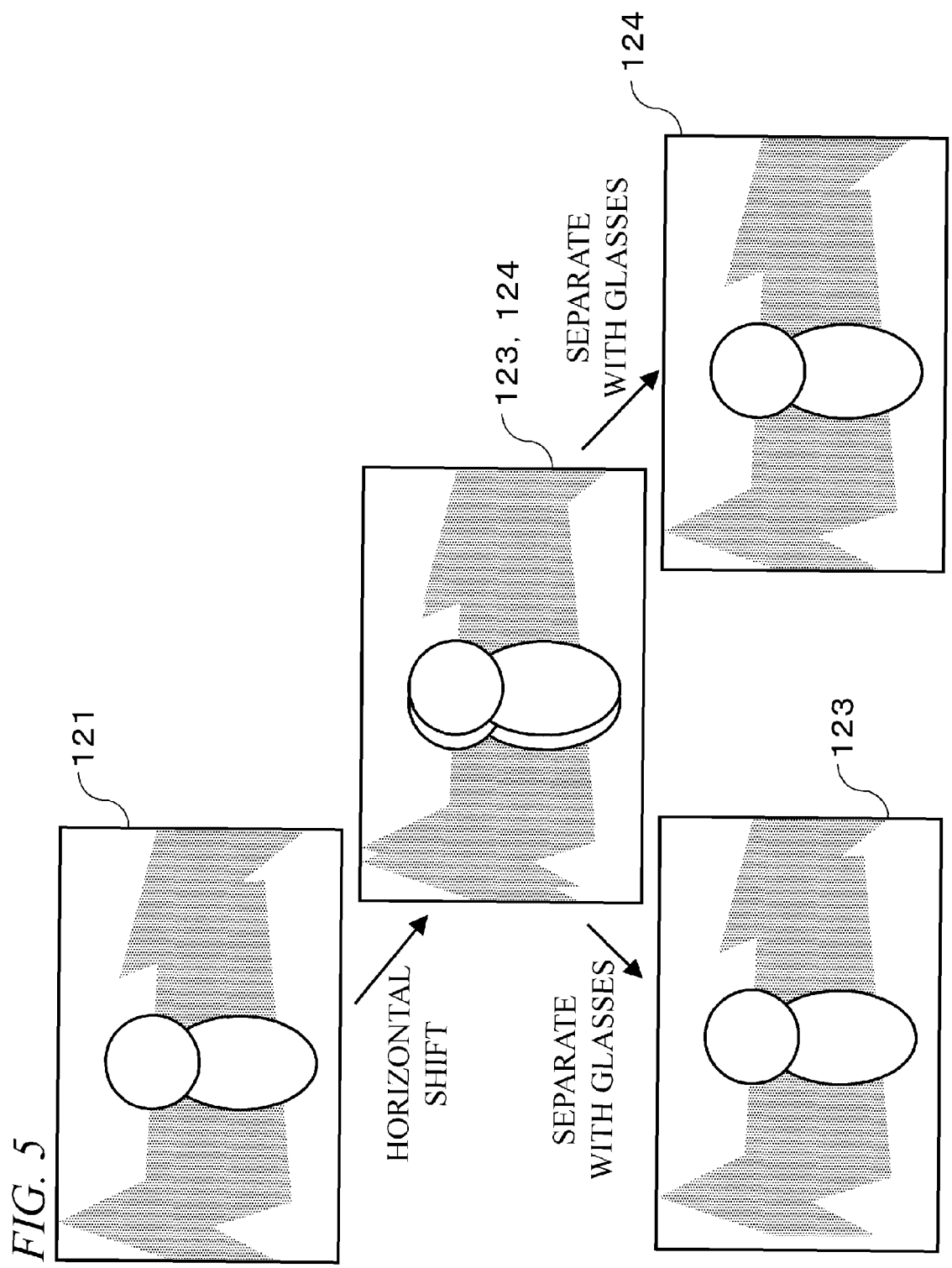
FIG. 5 is a diagram illustrating how a 2D image is converted into a 3D image according to the related-art example.

Referring to FIGS. 1, 2, and 3, an image processing apparatus and a control method therefor according to a first embodiment of the present invention will be described.

FIG. 1 is a diagram illustrating a functional configuration of an image processing apparatus according to this first embodiment. The image processing apparatus according to the first embodiment converts a 2D image into a 3D image composed of an image for a left eye and an image for a right eye.

In FIG. 1, the reference numeral 101 indicates a special filter unit for performing an image processing on an input 2D image to adjust the sharpness (blur amount) of the 2D image to an appropriate value. More specifically, the special filter unit 101 calculates, for each region (pixel) of the input 2D image, a sharpness of the region (calculation unit). The special filter unit 101 performs an image processing to increase the sharpness in a region having a calculated sharpness that is higher than a first predetermined value, whereas the special filter unit 101 performs an image processing to reduce the sharpness in a region having a calculated sharpness lower than a second predetermined value that is equal to or less than the first predetermined value (image processing unit). In this first embodiment, however, the special filter unit 101 does not perform an image processing to reduce the sharpness in a region having a calculated sharpness lower than a third predetermined value that is lower than the second predetermined value. It is assumed in this embodiment that the second predetermined value is equal to the first predetermined value.

The reference numeral 111 indicates an L/R-eye image generation unit for generating, from the 2D image which has been image-processed in the special filter unit 101, an image for a left eye (L-eye image) and an image for a right eye (R-eye image) by shifting the 2D image in a horizontal direction (generation unit). For example, the L/R-eye image generation unit 111 uses the image-processed 2D image directly as the R-eye image. The L/R-eye image generation unit 111 generates an L-eye image by shifting the image-processed 2D image rightward by a predetermined number of pixels. The method of generating the R-eye and L-eye images is not limited to this. The R-eye image and the L-eye image may be generated in any manner as long as either the R-eye image or the L-eye image is generated by shifting the image-processed 2D image in a horizontal direction. For example, the image-processed 2D image may be used directly as the L-eye image. In this case, the R-eye image may be generated by shifting the image-processed 2D image leftward by a predetermined number of pixels. Alternatively, the image-processed 2D image may be shifted rightward and leftward to generate an L-eye image and an R-eye image, respectively.

The reference numeral 112 indicates an image output unit for alternately outputting the L-eye image and the R-eye image generated by the L/R-eye image generation unit 111. This means that the image output unit 112 outputs a 3D image in a frame sequential format. When displaying a 3D image, for example, the image output unit 112 outputs the L-eye and R-eye images at a frame rate that is twice as high as the frame rate when a 2D image is displayed. More specifically, when the frame rate for displaying the 2D image is 60 Hz, the L-eye and R-eye images are output at a frame rate of 120 Hz. The output mode for the 3D image is not limited to the frame sequential format. The 3D image may be output in other formats such as a line-by-line format.

The reference numeral 113 indicates a display apparatus such as a LCD module for displaying the image output by the image output unit 112. The display apparatus may be either part of the image processing apparatus or a separate apparatus from the image processing apparatus.

The reference numeral 114 indicates shutter glasses designed such that the left and right lenses alternately let light pass through.

FIG. 2 is a diagram illustrating how a 2D image is converted into a 3D image according to the first embodiment.

In FIG. 2, the reference numeral 20 indicates an original image (input 2D image), the reference numeral indicates an image-processed image, the reference numeral 23 indicates an L-eye image, and the reference numeral 24 indicates an R-eye image. It is assumed in FIG. 2 that the sharpness of a region becomes higher as the solid line surrounding the region is thicker, whereas the sharpness of a region becomes lower as the density of the dots representing the region is lower. More specifically, the region 25 (background) is a region the sharpness of which should be reduced in order to obtain a sufficient three-dimensional effect (the region with an insufficient blur amount), whereas the region 26 (foreground) is a region the sharpness of which should be increased to obtain a sufficient three-dimensional effect (the region with an insufficient sharpness).

A specific example of the special filter unit 101 will be described with reference to FIG. 3.

FIG. 3 is a diagram illustrating an example of a configuration of the special filter unit 101.

In FIG. 3, the reference numeral 31 indicates a line memory for storing an original image sequentially line by line. In the example shown in FIG. 3, the line memory 31 outputs five consecutive pixels.

The reference numeral 32 indicates a comparison circuit which calculates a sharpness for each pixel and compares the calculated sharpness with a predetermined threshold. More specifically, the comparison circuit 32 calculates a sharpness for each pixel on the basis of five consecutive pixels centered at that pixel (in the same line).

The reference numeral 33 indicates a highpass filter for emphasizing horizontal edges (increasing the sharpness).

The reference numeral 34 indicates a lowpass filter for smoothing horizontal edges (reducing the sharpness).

The reference numeral 35 indicates a through circuit for directly outputting an input pixel (the center pixel in the five consecutive pixels).

The reference numeral 36 indicates a selector for selecting a pixel to be output according to a determination result of the comparison circuit 32.

The comparison circuit 32 calculates, as a sharpness, a gradient of the Y-value in the five consecutive pixels. A moderate gradient of the Y-value means that the blur is high, whereas a steep gradient means that there is substantially no blur. If the gradient is intermediate between them, it means that the blur is slight.

In this first embodiment, the sharpness is compared with a first (second) predetermined value (second threshold), and a third predetermined value (first threshold). If the sharpness is equal to or greater than the second threshold, the pixel to be processed (the center pixel of the five pixels) is determined to be a pixel in a region which is substantially not blurred. If the sharpness is greater than the first threshold but smaller than the second threshold, the pixel to be processed is determined to be a pixel in a region which is slightly blurred. If the sharpness is equal to or smaller than the first threshold, the pixel to be processed is determined to be a pixel in a region which is highly blurred.

According to the first embodiment, the sharpness is reduced (the blur amount is increased) in the region which is slightly blurred, whereas the sharpness is increased (the blur amount is reduced) in the region which is substantially not blurred. The sharpness is kept unchanged in the region which is highly blurred.

More specifically, when the pixel to be processed is determined to be a pixel in the region which is substantially not blurred, the selector 36 selects an output of the highpass filter 33.

When the pixel to be processed is determined to be a pixel in the region which is slightly blurred, the selector 36 selects an output of the lowpass filter 34.

When the pixel to be processed is determined to be a pixel in the region which is highly blurred, the selector 36 selects an output of the through circuit 35.

In this manner, the original image 20 is converted into an image 21 in which the sharpness has been reduced in the region which is slightly blurred and the sharpness has been increased in the region which is substantially not blurred.

When the original image 20 of FIG. 2 is image-processed by the special filter unit 101, a portion in focus (the region 25) becomes sharper, whereas a portion slightly out of focus (the region 26) becomes more blurred. Therefore, the three-dimensional effect can be enhanced in comparison with when no image processing is performed on the image (when the sharpness is not adjusted).

When the original image 20 is a portrait image with a sufficiently blurred background, the selector 36 selects an output of the through circuit 35 as a pixel of the background. Thus, the blur of the background is not increased.

As a result, it is made possible to prevent excessive enhancement of the three-dimensional effect which may cause difficulty in viewing, as well as deterioration of image quality caused by excessive blurring of the background.

After that, in the same manner as in the related art, the L/R-eye image generation unit 111 generates an L-eye image and an R-eye image from the mage 21, and the image output unit 112 outputs the L-eye image and the R-eye image alternately. The display apparatus 113 then displays the L-eye image and the R-eye image alternately. The user views the R-eye image with his/her right eye and the L-eye image with his/her left eye, with the use of the shutter glasses 114, whereby the user is enabled to see the 2D image in three dimensions.

A ratio of pop-out amounts between the foreground and the background as a relative value of the three-dimensional effect is determined by a difference between the sharpness of the foreground and the blur amount of the background.

The pop-out amount of the foreground as an absolute value of the three-dimensional effect is determined by a horizontal shift amount between the L-eye image and the R-eye image.

It is desirable, therefore, to determine the horizontal shift amount between the L-eye image and the R-eye image according to a screen size of the display apparatus or a preference of a viewer in order to set the three-dimensional effect to an appropriate level. If the screen size is large, it is desirable to set the initial value of the horizontal shift amount between the L-eye image and the R-eye image to a large value. It is also desirable to make the level of the three-dimensional effect (that is, whether the shift amount is increased or decreased from the initial value) adjustable according to a preference of the viewer.

According to the first embodiment, as described above, image processing is performed to increase the sharpness in a region where the sharpness is higher than the first predetermined value, whereas image processing is performed to reduce the sharpness in a region where the sharpness is lower than the second predetermined value. If the sharpness of an original image is insufficient to obtain an appropriate three-dimensional effect, the sharpness can be adjusted by this method to a value that is high enough to obtain the appropriate three-dimensional effect. For example, the sharpness of a region in which a portion in focus has a low sharpness is increased, and the blur amount of a region in which a portion out of focus has a low blur amount is increased (i.e. the sharpness is reduced). An image for a left eye and an image for a right eye are generated based on the 2D image that has been processed in this manner. It is thus made possible to convert a 2D image into a 3D image capable of providing an appropriate three-dimensional effect.

Second Embodiment

Figure 6:
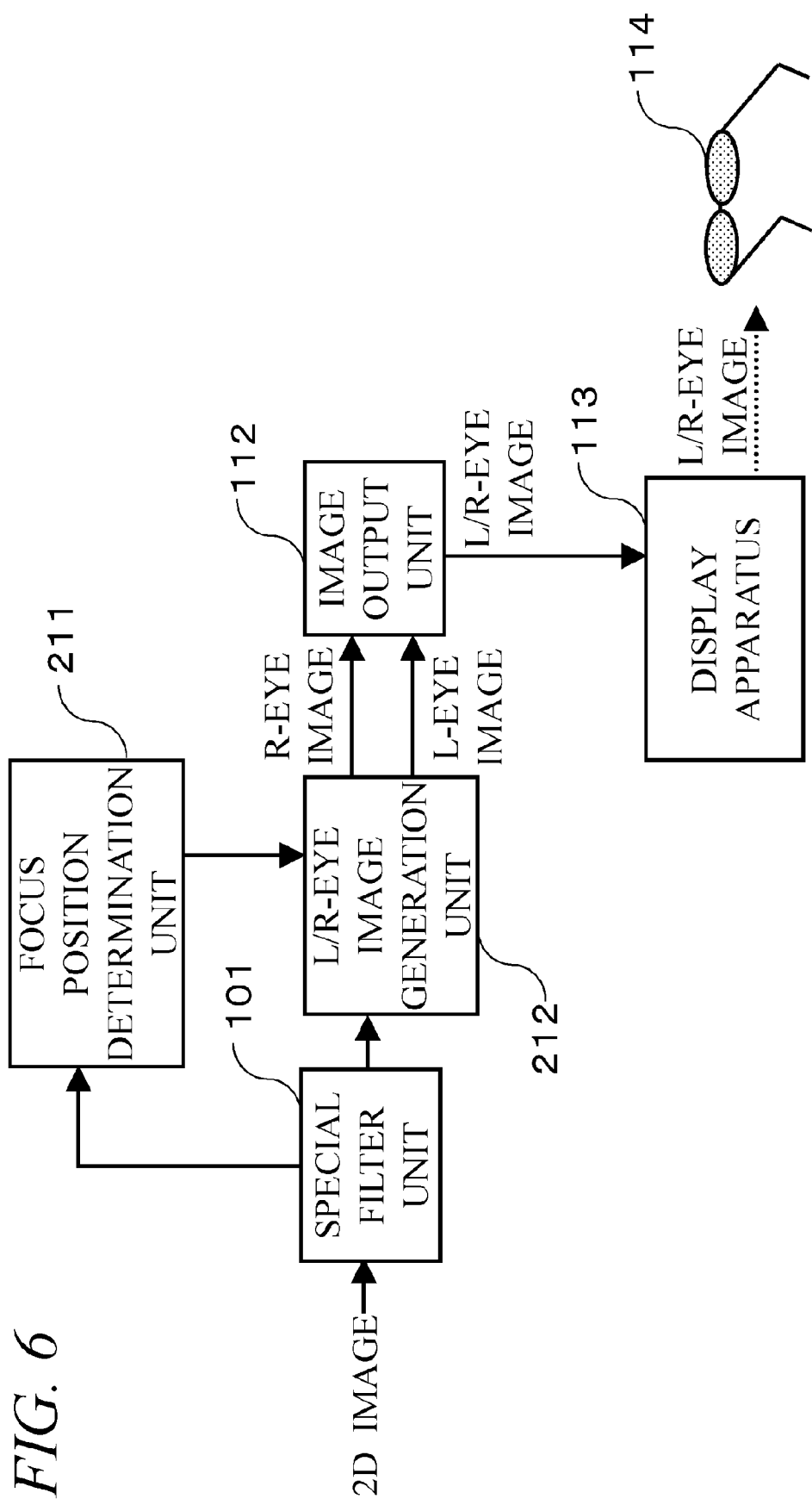
FIG. 6 is a diagram illustrating an example of a functional configuration of an image processing apparatus according to a second embodiment.
Figure 7:
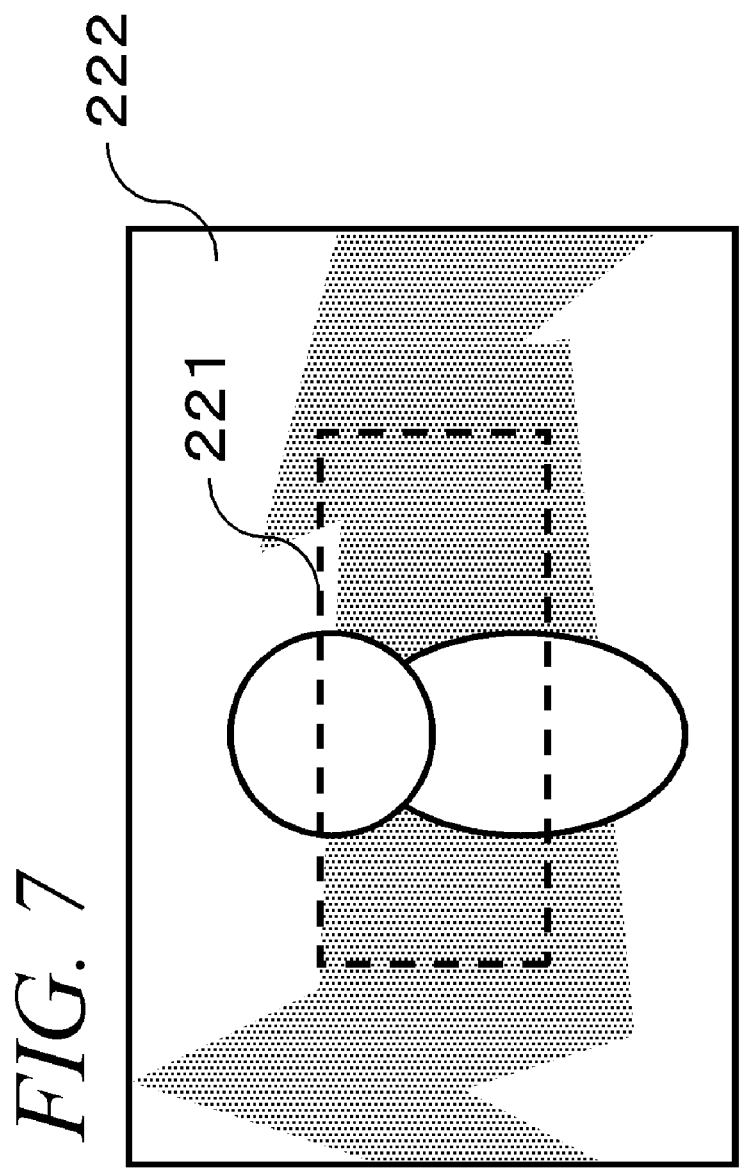
FIG. 7 is a conceptual diagram illustrating a function of a focus position determination unit.

Referring to FIGS. 6, 7 and 8, an image processing apparatus and a control method therefor according to a second embodiment of the present invention will be described.

FIG. 6 is a diagram illustrating a functional configuration of an image processing apparatus according to this second embodiment. The image processing apparatus according to the second embodiment converts a 2D image into a 3D image composed of an image for a left eye (L-eye image) and an image for a right eye (R-eye image). In FIG. 6, the same functions as those of the first embodiment (FIG. 1) are assigned with the same reference numerals, and description thereof will be omitted.

The reference numeral 211 indicates a focus position determination unit which determines whether the focus position of an input 2D image is in the foreground or in the background (determination unit).

The reference numeral 212 indicates an L/R-eye image generation unit which generates an L-eye image and an R-eye image from the input 2D image (image-processed image) based on a determination result of the focus position determination unit 211.

FIG. 7 is a conceptual diagram illustrating a function of the focus position determination unit 211. In FIG. 7, the reference numeral 221 indicates a central region of the image (the region surrounded by broken lines), and the reference numeral 222 indicates the region other than the central region of the image (peripheral region).

In a regular photography composition, an object closest to the camera is arranged in the center of the composition. Therefore, in this embodiment, the focus position determination unit 211 determines that the focus position is in the foreground when the focus position is located in the central region of the image. The determination method is not limited to this. Any other method may be employed, as long as it can determine whether the focus position is in the foreground or in the background.

Figure 8A:
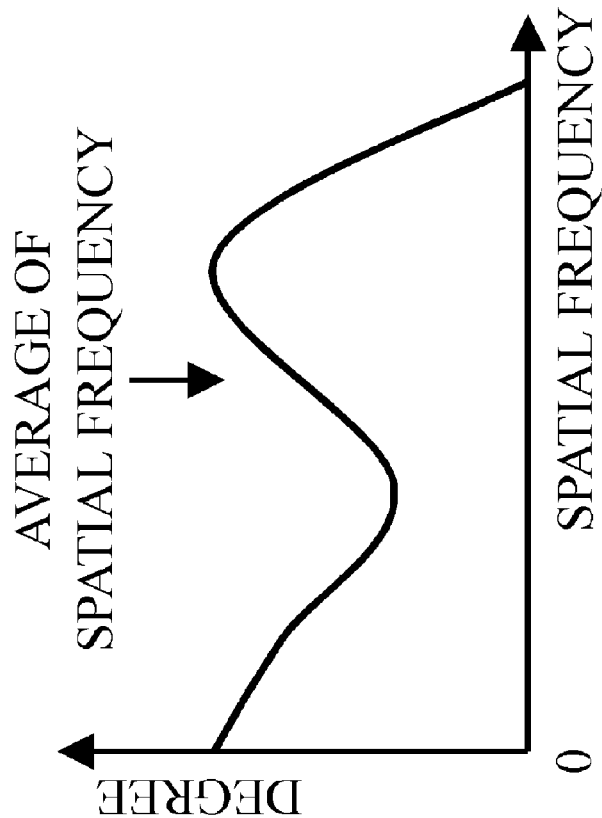
FIGS. 8A and 8B are diagrams illustrating an example of a histogram of spatial frequency in each region of FIG. 7.
Figure 8B:
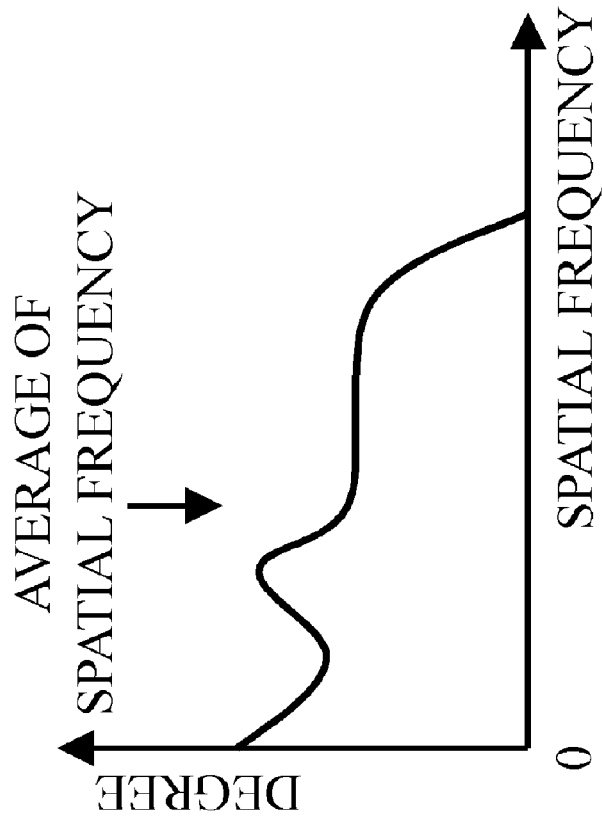

FIGS. 8A and 8B are diagrams illustrating an example of a histogram of spatial frequency in each region of FIG. 7.

The focus position determination unit 211 divides the input 2D image into the central region 221 and the peripheral region 222, and calculates spatial frequency distribution for each of the regions to obtain a histogram of spatial frequency. The histogram as shown in FIGS. 8A and 8B for example is obtained.

The focus position determination unit 211 calculates an average value of spatial frequency for each of the regions based on the corresponding histogram.

The focus position determination unit 211 then compares the average value of spatial frequency of the central region with the average value of spatial frequency of the peripheral region, and determines either the central region or the peripheral region, whichever has a greater average value of spatial frequency (whichever has a higher spatial frequency) is the region in focus.

Specifically, when the average value of spatial frequency of the central region is greater than the average value of spatial frequency of the peripheral region, the focus position determination unit 211 determines that the focus position is in the foreground. On the contrary, when the average value of spatial frequency of the central region is smaller than the average value of spatial frequency of the peripheral region, the focus position determination unit 211 determines that the focus position is in the background.

When it is determined that the focus position is in the foreground, the L/R-eye image generation unit 212 generates, as an L-eye image, an image that has been shifted rightward relative to an R-eye image. When it is determined that the focus position is in the background, the L/R-eye image generation unit 212 generates, as an L-eye image, an image that has been shifted leftward relative to an R-eye image.

The R-eye image and the L-eye image thus generated are displayed by a display apparatus in the same manner as in the first embodiment. The user views the R-eye image with his/her right eye and the L-eye image with his/her left eye, with the use of the shutter glasses 114.

When the L-eye image is generated as an image shifted rightward relative to the R-eye image, the portion in focus seems to pop forward. When the L-eye image is generated as an image shifted leftward relative to the R-eye image, the portion in focus seems to recede back.

According to the second embodiment, an L-eye image is generated as an image shifted rightward relative to an R-eye image, when it is determined that the focus position is in the foreground. When it is determined that the focus position is in the background, in contrast, an L-eye image is generated as an image shifted leftward relative to an R-eye image. This makes it possible to convert a 2D image into a 3D image in which an object is depicted in a correct front-and-back relationship, regardless of the focus position in the 2D image.

Of course, there may exist some exceptional images the front-and-back relationship of which is not known according to the second embodiment, and in such a case, the front-and-back relationship may be reversed.

In the second embodiment, the focus position is estimated based on an image only. However, the focus position can be estimated using Exif data as well, if a distance to the object is recorded in the Exif data. For example, if the distance to the object is within 10 m, it can be determined that the focus position is in the foreground. If the distance is 10 m or more, it can be determined that the focus position is in the background.

The image processing apparatus need not necessarily have the special filter unit 101. If the image processing apparatus does not have the special filter unit 101, the L/R-eye image generation unit 212 generates an image for a left eye and an image for a right eye based on an original image. This configuration also provides advantageous effects equivalent to those described above.

Third Embodiment

Next, an image processing apparatus and a control method therefor according to a third embodiment of the present invention will be described. This third embodiment is a modification of the first embodiment. The description below will be made focusing on different features from the first embodiment while description on the same functions as those of the first embodiment will be omitted.

Figure 9:
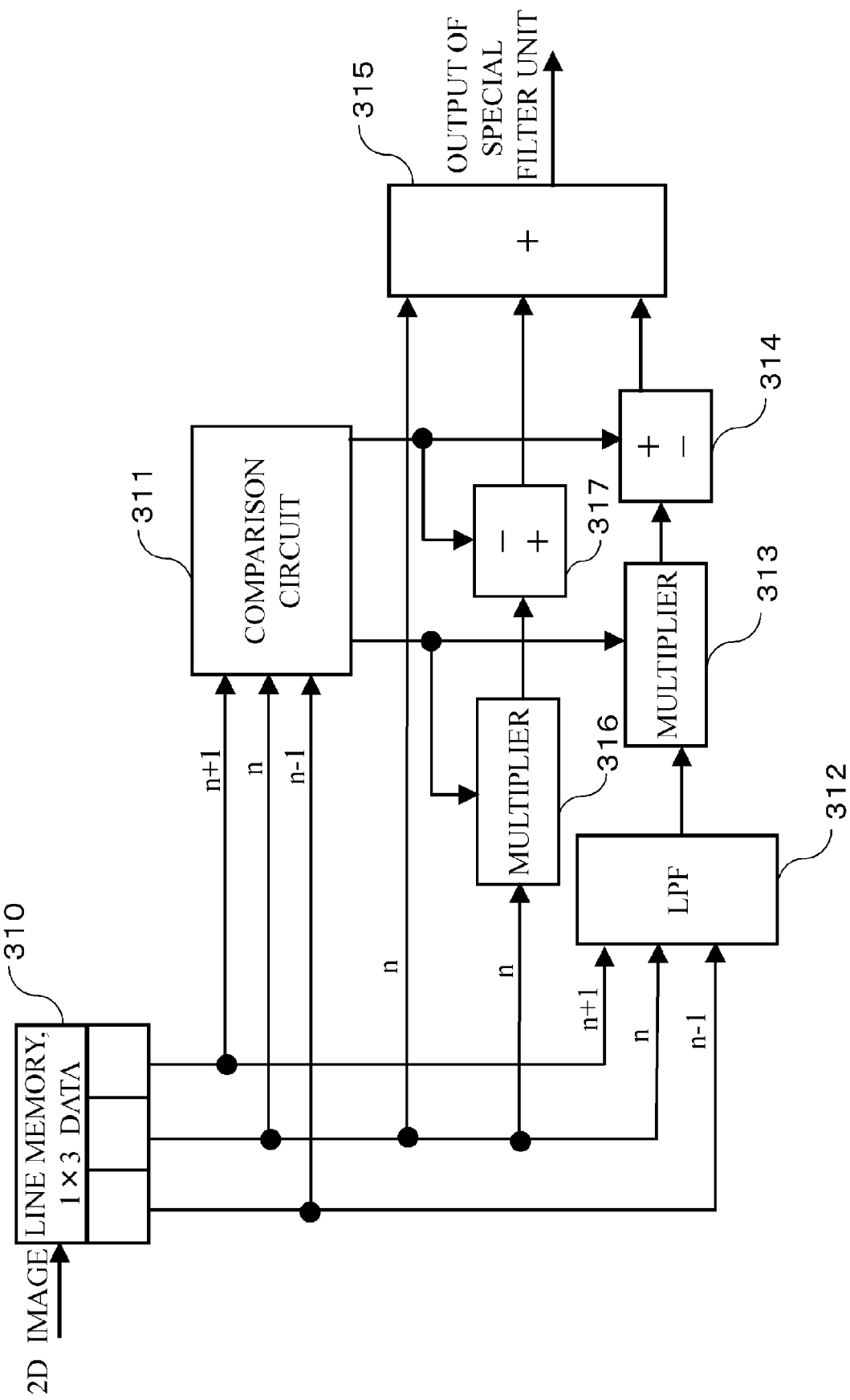
FIG. 9 is a diagram illustrating an example of a configuration of a special filter according to the third embodiment.

FIG. 9 is a diagram illustrating an example of a configuration of a special filter according to the third embodiment.

In FIG. 9, the reference numeral 310 indicates a line memory which sequentially stores an original image line by line. In the example shown in FIG. 9, the line memory 310 outputs successive three pixels ((n−1)-th, n-th, and (n+1)-th pixels from the left side of the image (n is a positive integer)).

The reference numeral 311 indicates a comparison circuit which calculates a sharpness of each pixel and compares the calculated sharpness with predetermined thresholds (parameters A to D to be described later).

The reference numeral 312 indicates a lowpass filter.

The reference numeral 313 indicates a multiplier which multiples the pixel value output from the lowpass filter 312 by a coefficient according a comparison result of the comparison circuit 311.

The reference numeral 314 indicates a sign setting unit which sets the sign of the pixel value output from the multiplier 313 to positive or negative according to a comparison result of the comparison circuit 311.

The reference numeral 316 indicates a multiplier which multiples the pixel value of the original image by a coefficient according to a comparison result of the comparison circuit 311. The multiplier 316 uses the same coefficient as the one used by the multiplier 313.

The reference numeral 317 indicates a sign setting unit which sets the sign of the pixel value output from the multiplier 316 to positive or negative according to the comparison result of the comparison circuit 311. The sign setting unit 317 sets a sign opposite to the sign set by the sign setting unit 314.

The reference numeral 315 indicates an adder which adds up the pixel value of the original image, the pixel value output by the sign setting unit 314, and the pixel value output by the sign setting unit 317. The output value of the adder 315 is the output value of the special filter.

The pixel value of the original image is multiplied by the same coefficient as the coefficient used in the multiplier 313, and the pixel value having a sign which is set opposite to the sign set by the sign setting unit 314 is used in the adder 315, so that the DC component of the image is maintained.

If the Y-value is in the range from 0 to 255 in terms of gradation value, the comparison circuit 311 divides the Y-value by 255 to normalize the same to a value of 0 to 0.1. The sharpness is then calculated in the manner as follows.

Sharpness=MAX[ABS($Y(n)-Y(n-1)$),ABS($Y(n)-Y(n+1)$)]/[$Y(n)$+MAX($Y(n-1),Y(n+1)$)]

In the equation above, Y (n) denotes a Y-value of the n-th pixel, MAX denotes a coefficient to output the greater one of the two terms, and ABS denotes a coefficient to output an absolute value of the term.

For example, when $Y(n-1)$=40, $Y(n)$=60, and $Y(n+1)$=100, Sharpness=MAX(20,40)/(60+100)=0.25

Subsequently, image processing is performed as described below in accordance with the comparison result between sharpness and parameters A to D (parameter A>parameter B>parameter C>parameter D). More specifically, according to the comparison result, the comparison circuit 311 determines a coefficient that is used in the multipliers 313 and 316 and a sign that is set by the sign setting units 314 and 317. The parameters A to D are preliminarily set such that, for example, parameter A≅0.8, parameter B≅0.6, parameter C≅0.4, and parameter D=0.2. As mentioned in the above, the multiplier 316 uses the same coefficient as the one used in the multiplier 313, and the sign setting unit 317 sets an opposite sign to the one set by the sign setting unit 314. Therefore, the description below will be made only on the coefficient used by the multiplier 313 and the sign set by the sign setting unit 314.

When the sharpness is greater than the parameter A:

As the edge is steep enough (a sufficient three-dimensional effect is obtained without any processing), the sharpness is left unchanged (the sharpness is left as in the original image). More specifically, the multiplier 313 uses a coefficient of zero or a value close to zero, and the sign setting unit 314 sets the sign negative.

When the sharpness is greater than the parameter B (first predetermined value) and smaller than the parameter A:

As the edge is not steep enough, the edge is sharpened to obtain a higher three-dimensional effect (the sharpness is increased). More specifically, the multiplier 313 uses a coefficient of about 0.5, and the sign setting unit 314 sets the sign negative.

When the sharpness is greater than the parameter C and smaller than the parameter B:

As the edge is intermediate, being not too steep and not too weak, the sharpness is left unchanged. More specifically, the multiplier 313 uses a coefficient of about zero, and the sign setting unit 314 sets the sign positive.

When the sharpness is greater than the parameter D and smaller than the parameter C (the second predetermined value):

As the edge is not enough, that is, slightly blurred, the edge is softened to obtain a higher three-dimensional effect (the sharpness is reduced). More specifically, the multiplier 313 uses a coefficient of about 0.5, and the sign setting unit 314 sets the sign positive.

When the difference is smaller than the parameter D (the third predetermined value):

As there is no edge and the edge is completely blurred (a sufficient three-dimensional effect can be obtained in situ), the sharpness is left unchanged. More specifically, the multiplier 313 uses a coefficient of zero or a value close to zero, and the sign setting unit 314 sets the sign positive.

According to the third embodiment, like the first embodiment, a 2D image can be converted into a 3D image which is capable of providing an appropriate three-dimensional effect.

The three-dimensional effect can be further enhanced by setting the coefficient to a value greater than 0.5, such as 1.0.

The processing by the special filter described in this embodiment is processing to dynamically change the positive and negative coefficients during unsharp mask processing in an image processing technique.

Although, in this embodiment, the configuration is such that the coefficient used by the multiplier and the sign set by the sign setting unit are determined by comparing the sharpness with predetermined thresholds, the coefficient and the sign may be calculated from the sharpness by using a predetermined function.

FIGS. 10A to 10F are graphs each illustrating an example of a function for receiving a sharpness and outputting a function used by the multiplier 313 and a sign set by the sign setting unit 314. Each function is characterized as follows.

The function of FIG. 10A is for reducing most the sharpness of a slightly blurred region (region with a sharpness of 0.25), and is for increasing most the sharpness of a region with a slightly strong edge (region with a sharpness of 0.75). As the sharpness of these regions moves away from their sharpness (0.25, 0.75), the function reduces the correction amount (coefficient) for that region.

The function of FIG. 10B is different from that of FIG. 10A in that the function of FIG. 10B reduces the sharpness of a significantly blurred region (region with a sharpness less than 0.25), and increases the sharpness of a region with a strong edge (region with a sharpness greater than 0.75). Specifically, the same coefficient and the same sign are used for a region with a sharpness less than 0.25 as those for a region with a sharpness of 0.25. The same coefficient and the same sign are used for a region with a sharpness greater than 0.75 as those for a region with a sharpness of 0.75. The use of the function of FIG. 10B will enhance the three-dimensional effect but slightly deteriorate the image quality in comparison with the case in which the function of FIG. 10A is used.

Figure 10C:
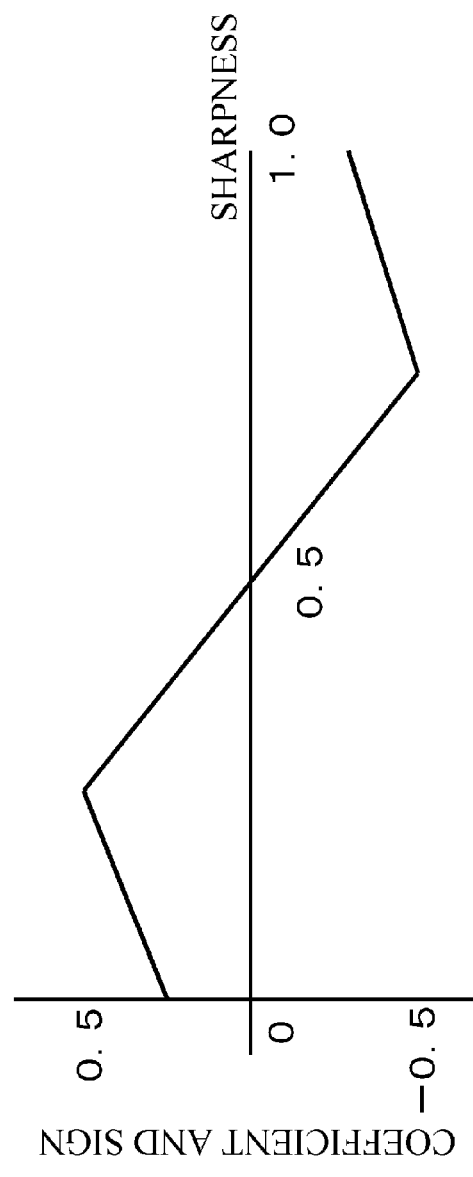

The function of FIG. 10C has an intermediate characteristic between those of FIG. 10A and FIG. 10B, and is capable of enhancing the three-dimensional effect to some extent while suppressing the deterioration of image quality.

Figure 10D:
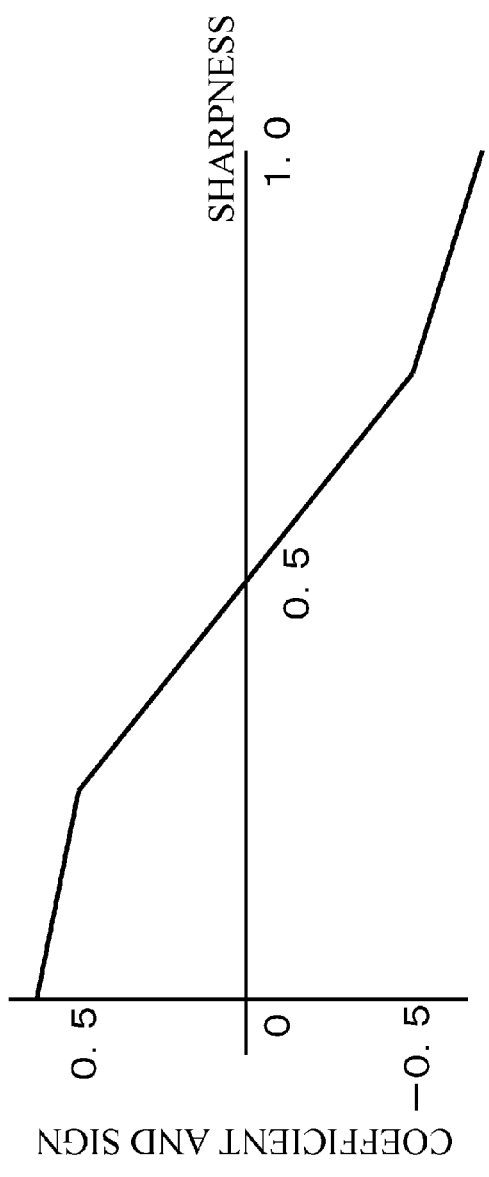

The function of FIG. 10D is obtained by making the gradient of the function at a sharpness less than 0.25 and at a sharpness greater than 0.75 slightly smaller than the gradient at a sharpness equal to or greater than 0.25 and equal to or smaller than 0.75. If the gradient is made uniform over the entire range of sharpness (i.e. the function represents a complete straight line), the three-dimensional effect will become so strong that a viewer may feel uncomfortable, or the deterioration of the image quality becomes noticeable. The function of FIG. 10D suppresses such harmful effects a little, and is used to emphasize the three-dimensional effect.

The function of FIG. 10E is to enhance the correction only of a region blurred more than that of FIG. 10A, and to emphasize the three-dimensional effect.

The function of FIG. 10F is to increase the degree of blur in a significantly blurred region to emphasize the edge more. The function of FIG. 10F has similar characteristics to a function representing a straight line. However, in comparison with the case of a linear function, the correction amount of sharpness is suppressed only in a region where a harmful effect of too much blur likely occurs (region with a sharpness of approximately zero).

The use of the aforementioned functions also makes it possible to convert a 2D image into a 3D image with an appropriate three-dimensional effect according to the degree of blur of the original image. The function to be used may be made switchable among the plurality of functions. For example, the function to be used may be switchable according to a type of image mode such as sports, landscape, and cinema. This makes it possible to obtain an appropriate three-dimensional effect according a type of an original image. More specifically, as for the sports mode, the functions of FIGS. 10B, 10C, and 10D can be used. For the landscape mode, the functions of FIGS. 10A and 10C can be used. For the cinema mode, the functions of FIGS. 10E and 10F can be used.

It should be understood that the embodiments described above are applicable regardless of whether an input image is still image or moving image.

Although the embodiments have been described in terms of the case in which image processing is performed to adjust the sharpness in units of pixels, the image processing may be performed in units of regions such as units of objects composed of a plurality of pixels, instead of in units of pixels.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-254018, filed on Nov. 12, 2010, which is hereby incorporated by reference herein in its entirety.

What is claimed is:

1. An image processing apparatus for converting a 2D image into a 3D image composed of an image for a left eye and an image for a right eye, the image processing apparatus comprising:

an image processor that calculates a sharpness of a 2D image for each region thereof and that performs image processing, in a region with a calculated sharpness being higher than a first predetermined value, to increase that sharpness, and performs image processing, in a region with a calculated sharpness being lower than a second predetermined value which is equal to or lower than the first predetermined value, to reduce that sharpness; and an image generator that generates, from the 2D image processed by the image processor, an image for a left eye and an image for a right eye by shifting the 2D image in a horizontal direction.

2. The image processing apparatus according to claim 1, wherein the image processor does not perform the image processing to reduce the sharpness in a region with a calculated sharpness being lower than a third predetermined value which is lower than the second predetermined value.

3. The image processing apparatus according to claim 2, wherein the image processor further determines whether a focus position of the 2D image is in its foreground or background, wherein when the focus position is in the foreground, the image generator generates the image for a left eye by shifting the 2D image rightward relative to the image for a right eye, whereas when the focus position is in the background, the image generator generates the image for a left eye by shifting the 2D image leftward relative to the image for a right eye.

4. The image processing apparatus according to claim 3, wherein the image processor determines that the focus position is in the foreground when the focus position is located at a central region of the image.

5. The image processing apparatus according to claim 1, wherein the image processor further determines whether a focus position of the 2D image is in its foreground or background, wherein when the focus position is in the foreground, the image generator generates the image for a left eye by shifting the 2D image rightward relative to the image for a right eye, whereas when the focus position is in the background, the image generator generates the image for a left eye by shifting the 2D image leftward relative to the image for a right eye.

6. The image processing apparatus according to claim 5, wherein the image processor determines that the focus position is in the foreground when the focus position is located at a central region of the image.

* * * * *